(No Model.)　　　　C. H. FARRINGTON.　　2 Sheets—Sheet 1.
BONE CUTTING MACHINE.
No. 517,003.　　　　　　　　Patented Mar. 20, 1894.
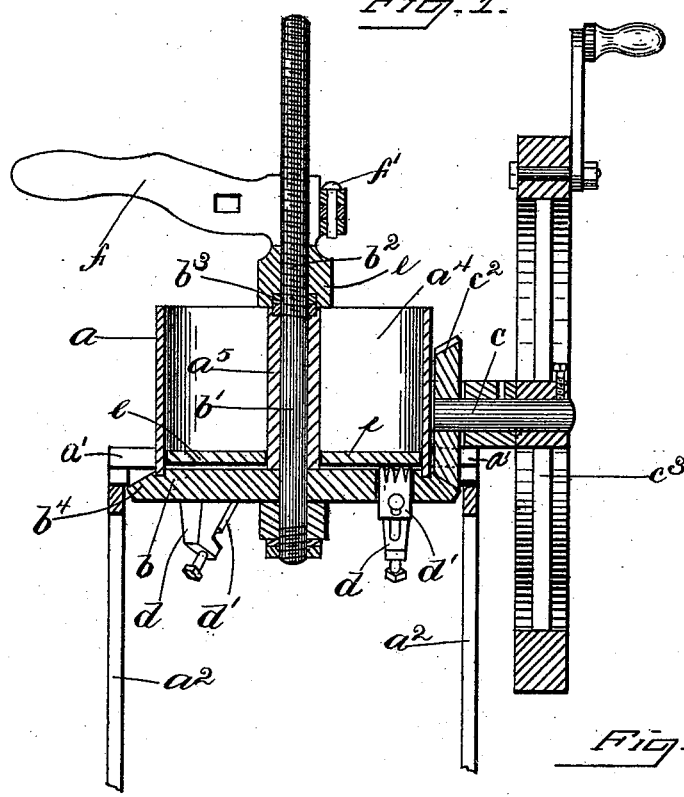
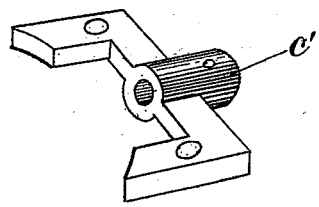
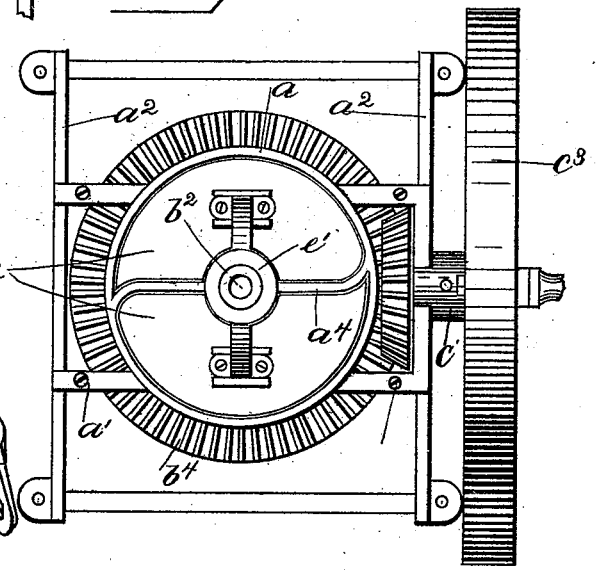
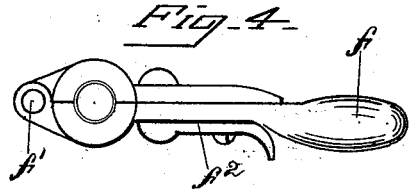
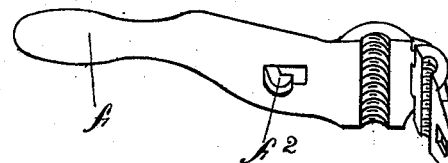
WITNESSES
Charles B. Crocker.
Jonas R. Foster.
INVENTOR
Clarence H. Farrington,
by B. J. Noyes
atty.
THE NATIONAL LITHOGRAPHING COMPANY,
WASHINGTON, D. C.

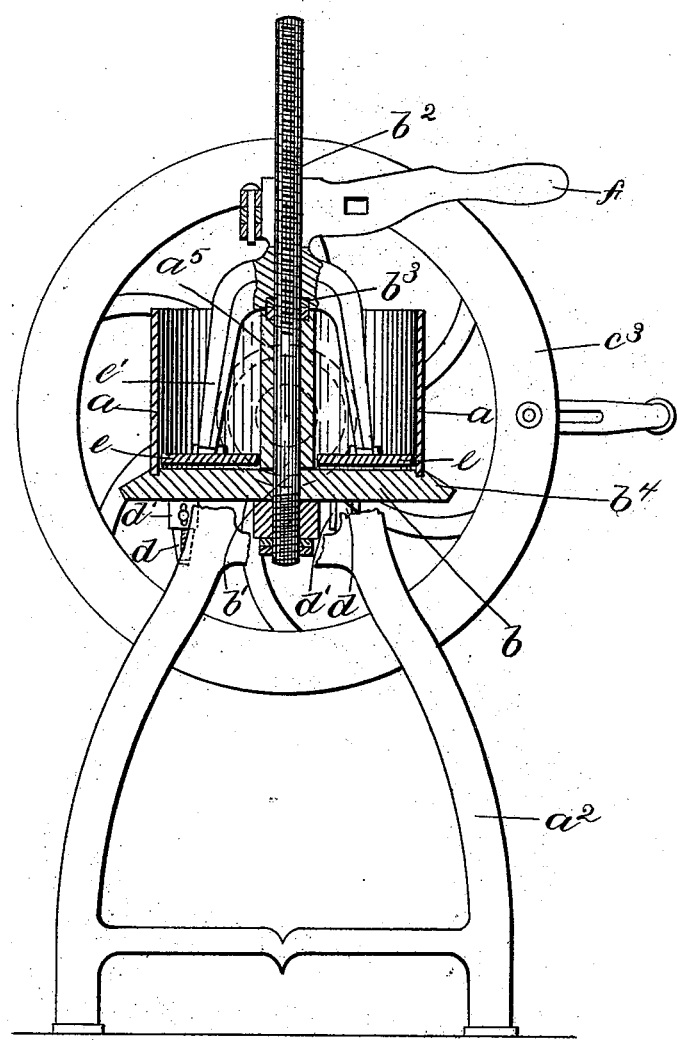

UNITED STATES PATENT OFFICE.

CLARENCE H. FARRINGTON, OF MILFORD, MASSACHUSETTS, ASSIGNOR TO F. W. MANN, OF SAME PLACE.

BONE-CUTTING MACHINE.

SPECIFICATION forming part of Letters Patent No. 517,003, dated March 20, 1894.

Application filed June 6, 1892. Serial No. 435,586. (No model.)

*To all whom it may concern:*

Be it known that I, CLARENCE H. FARRINGTON, of Milford, county of Worcester, State of Massachusetts, have invented an Improvement in Bone-Cutting Machines, of which the following description, in connection with the accompanying drawings, is a specification, like letters on the drawings representing like parts.

This invention has for its object to improve the construction of the bone cutting machine shown in Patent No. 409,480, dated August 20, 1889, the support for the rotatable bottom plate, and the feeding mechanism being the particular parts wherein my invention resides.

In accordance with this invention the rotatable bottom plate which carries the knives is rigidly secured to the lower end of a rod or shaft which passes axially through the stationary cylinder, a suitable bearing being contained within said cylinder in which said rod or shaft freely turns. Suitable means are provided for rotating said knife carrying bottom plate. A platen or follower is contained in the cylinder which slides vertically and without rotation on the said rotating rod or shaft as a guide. The upper end of said rotating rod or shaft is screw threaded, and receives upon it an internally screw threaded hand piece or other device which is adapted to bear against the platen or follower, or it may be the frame to which it is attached, so that as the said rod or shaft is rotated with the bottom plate to which it is connected, said hand piece or other device if held by hand or otherwise restrained from rotation with said rod or shaft, will move down or along the screw threaded portion thereof, to in turn move the platen or follower, but if unrestrained or left free to rotate with said rod, it will not move down or along the screw threaded portion thereof, and therefore will not act to move or feed forward the platen or follower. Hence the feeding mechanism is operated by the power applied to the machine, but controlled manually.

Figure 1, shows in vertical section a machine for grinding or cutting bone embodying this invention; Fig. 2, a plan view of the machine shown in Fig. 1; Fig. 3, a detail of the bearing for the driving shaft, the feed handle being removed; Figs. 4 and 5, details of the feed handle, and Fig. 6, a vertical section of the machine shown in Fig. 2.

The cylinder $a$, having lugs $a'$, at its lower end by means of which it is supported on the frame work or legs $a^2$, the division wall $a^4$, arranged diametrically in said cylinder $a$, from top to bottom, and the tubular bearing $a^5$, formed integral with said division wall, at the center of the cylinder $a$, are all as shown in the said patent. The bottom plate $b$, is rigidly secured to the lower end of a rod or shaft $b'$, which passes up through said bearing $a^5$ in which it is free to rotate, and on the upper screw threaded portion $b^2$, of said rod $b'$, suitable circular check nuts or collars $b^3$, are placed which enter a circular socket or recess formed in the upper end of said bearing $a^5$, and turning with said rod or shaft serve as a means of supporting the bottom plate. In lieu of said check nuts or collars $b^3$, any other suitable means may be provided for supporting the bottom plate on a step upon which it will be free to rotate. The bottom plate $b$, is made larger in diameter than the cylinder $a$, and is provided outside of said cylinder with teeth which form a bevel gear $b^4$, and the driving shaft $c$, has its bearings in a block $c'$, secured to one of the side frames $a^2$, by bolts or otherwise, which has fixed to it a bevel gear $c^2$, which engages and drives said bevel gear $b^4$, said driving shaft being rotated by means of a hand wheel $c^3$, fixed to it or otherwise. The bottom plate $b$, is provided with a series of holes of suitable size, up through which the cutting edges of the knives $d$, project, which knives are supported on lugs $d$, formed integral with or secured to the under side of said bottom plate. These knives are suitably inclined, and act as planing knives to plane off the bone. A slotted platen or follower $e$, of suitable size to enter and move freely within the cylinder $a$, is secured to the yoke or frame $e'$, which is arranged to slide freely on the vertical rod $b'$, which serves as a guide therefor, said follower bearing upon the material contained in the cylinder, to press it down, so that it may be acted upon by the knives. The handle $f$, provided with a screw threaded end or bore is adapted to engage the screw threaded part $b^2$, of the rod $b'$, bearing upon the yoke or frame of the platen or follower. This handle $f$, is herein represented as having its screw threaded end made in two halves, joined by a hinge $f'$, and a latch $f^2$, is provided for fastening the two halves rigidly together, yet permitting them to be separated when desired, as shown in Figs. 4 and 5. The handle $f$, having been placed on the screw threaded portion $b^2$, of the rod $b'$, and the bottom plate $b$, rotated, the said handle if held stationary, or restrained from rotation with the said rod, will move along the screw threaded portion $b^2$, thereof, in turn advancing the platen or follower to press the material down, but if said handle is left free or unrestrained, it will rotate with said rod, and hence will not operate to advance said platen or follower. Thus it will be seen that with this form of feeding device when the handle $f$, is held by hand or otherwise the platen will be advanced, and when said handle is released, it will rotate with the rod, and the platen will not advance. The handle $f$ made in two parts hinged together is preferable, as it enables it to be removed from the screw threaded portion $f^2$ of the rod $b'$ quickly, whenever desired, yet it is obvious that the feeding mechanism will operate the same whether the handle is made in two parts or in a single piece. This form of feeding mechanism is much simpler and easier to operate than that shown in the patent referred to, and hence possesses many advantages over it. When the machine is running the excessive pressure applied to the platen or follower is resisted by the hand piece $f$, thereby relieving the nuts $b^3$, and as the bottom plate $b$ is rigidly connected to the rod or shaft $b'$, the latter turning with said bottom plate provides a power operated feeding mechanism controlled by hand, instead of a hand operated feeding mechanism; and furthermore a long and stable bearing is provided for the rotating rod or shaft which prevents the bottom plate from tipping or wabbling, and such a shaft is easy to oil and care for. When the handle $f$ is removed from its engagement with the screw threaded portion of the rod $b'$, the weight of the bottom plate will then be supported by the check nuts or collars $b^3$, and also when the cylinder is empty, or when the feeding platen is removed for the purpose of filling the cylinder the weight of the bottom plate will be supported by said check nuts or collars $b^3$.

I claim—

1. In a machine for cutting bones the combination of the following instrumentalities:— a stationary cylinder, a bearing within it, a rod or shaft adapted to turn freely in said bearing, the upper end of which is screw threaded, a knife carrying bottom plate rigidly secured to the lower end of said rod or shaft by means of which it is rotated, and means for rotating said knife carrying bottom plate, a platen or follower adapted to slide on said rod or shaft as a guide, and a hand piece having a screw threaded bore which receives the said screw threaded end of the rod or shaft, and adapted to be moved along said rod or shaft when held at rest and said rod or shaft rotates within it, and to turn with said rotating rod or shaft when unrestrained, substantially as described.

2. In a machine for cutting bone, a cylinder, a rotatable knife carrying bottom plate, and means for rotating it, and a platen or follower contained in said cylinder, combined with a screw threaded rod or shaft to which said bottom plate, is rigidly secured, and upon which the follower slides, and a handle having a screw threaded bore to receive said screw threaded portion of said rod or shaft, said handle bearing against and moving the follower when restrained from rotation with the rod or shaft, but not moving it when unrestrained, and thereby left free to rotate with the rod or shaft, substantially as described.

3. In a machine for cutting bone, a cylinder and a rotatable knife carrying bottom plate, and means for rotating it, a platen or follower contained in said cylinder, combined with a rotatable screw threaded rod or shaft upon which the follower slides but does not engage, and a handle having a screw threaded bore to receive said rod or shaft, whereby the follower may be moved or not, according to whether the said handle is restrained from rotation with the rod or shaft, and thereby fed along, or is left free to rotate with said rod or shaft, substantially as described.

4. In a machine for cutting bone, a cylinder, a rotatable knife carrying bottom plate, and means for rotating it, a rod or shaft $b'$, to which said bottom plate is rigidly secured and means for holding the bottom plate up against the end of the cylinder, combined with a follower or platen contained in said cylinder and movable freely along said rod or shaft $b'$, as a guide, and a handle on the screw threaded portion of said rod $b'$, by means of which said follower may be moved or not as desired, substantially as described.

5. In a machine for cutting bone, a cylinder and follower therein, and a screw threaded feed rod passing freely through said follower, combined with a handle having a screw theaded bore to receive said screw threaded feed rod, and move thereon when restrained from rotation with said rod, but not move thereon when rotating with said rod, whereby the follower may be moved or not at will, substantially as described.

6. In a machine for cutting bone, a cylinder and follower therein, and a screw threaded feed rod passing freely through said follower, combined with a handle $f$, having a screw threaded bore, made in two parts hinged together, and a latch for connecting the said parts together, said handle being placed on said screw threaded feed rod, to operate, substantially as described.

7. In a machine for cutting bone, a cylinder, a rotatable knife carrying bottom plate, and means for rotating it, a rod or shaft, to which said bottom plate is rigidly secured, and means for holding the bottom plate up against the end of the cylinder, combined with a follower or platen contained in said cylinder, and guided in its movement by said rod or shaft, and a handle on the screw threaded portion of said rod by means of which said follower may be moved or not as desired, substantially as described.

8. In a bone cutting machine the combination of the stationary cylinder open at its lower end and having a rigidly supported central bearing $a^6$, a knife carrying bottom plate closing the lower end of said cylinder, means for rotating it, a feed screw contained in said bearing $a^6$, and rigidly secured at its lower end to said bottom plate, supporting nut $b^8$, on said screw turning with it, a platen or follower and yoke or frame mounted loosely on said feed screw, and the hand piece $f$ engaging said feed screw, advancing thereon when restrained from rotation, and turning with it when unrestrained, substantially as described.

9. In a bone cutting machine, the combination of the cylinder open at its lower end, a knife carrying bottom plate closing said open end, and means for rotating it, a platen or follower and feeding mechanism therefor a co-operative part of which is secured to and operated in unison with said bottom plate, and another co-operative part of which is adapted when unrestrained to remain at any point on the feed shaft, but when restrained to rise and fall thereon, substantially as described.

10. In a bone cutting machine, the combination of a bone receiver, one or more cutting knives, and means for operating them, a follower or platen, power operated feeding mechanism therefor, a co-operative part of which is provided with a hand piece whereby the follower or platen may be held at any point on the feed shaft or rise and fall thereon, substantially as described.

In testimony whereof I have signed my name to this specification in the presence of two subscribing witnesses.

CLARENCE H. FARRINGTON.

Witnesses:
LEWIS HAYDEN,
JOSEPH HANCOCK.